Aug. 12, 1952  L. P. FRIEDER ET AL  2,606,729
DELAY OPENING PARACHUTE PACK AND PNEUMATIC
RELEASING ASSEMBLY THEREFOR
Filed May 25, 1949  4 Sheets-Sheet 1

INVENTORS
LEONARD P. FRIEDER
WALTER S. FINKEN
BY Henry L. Shevier
ATTORNEY

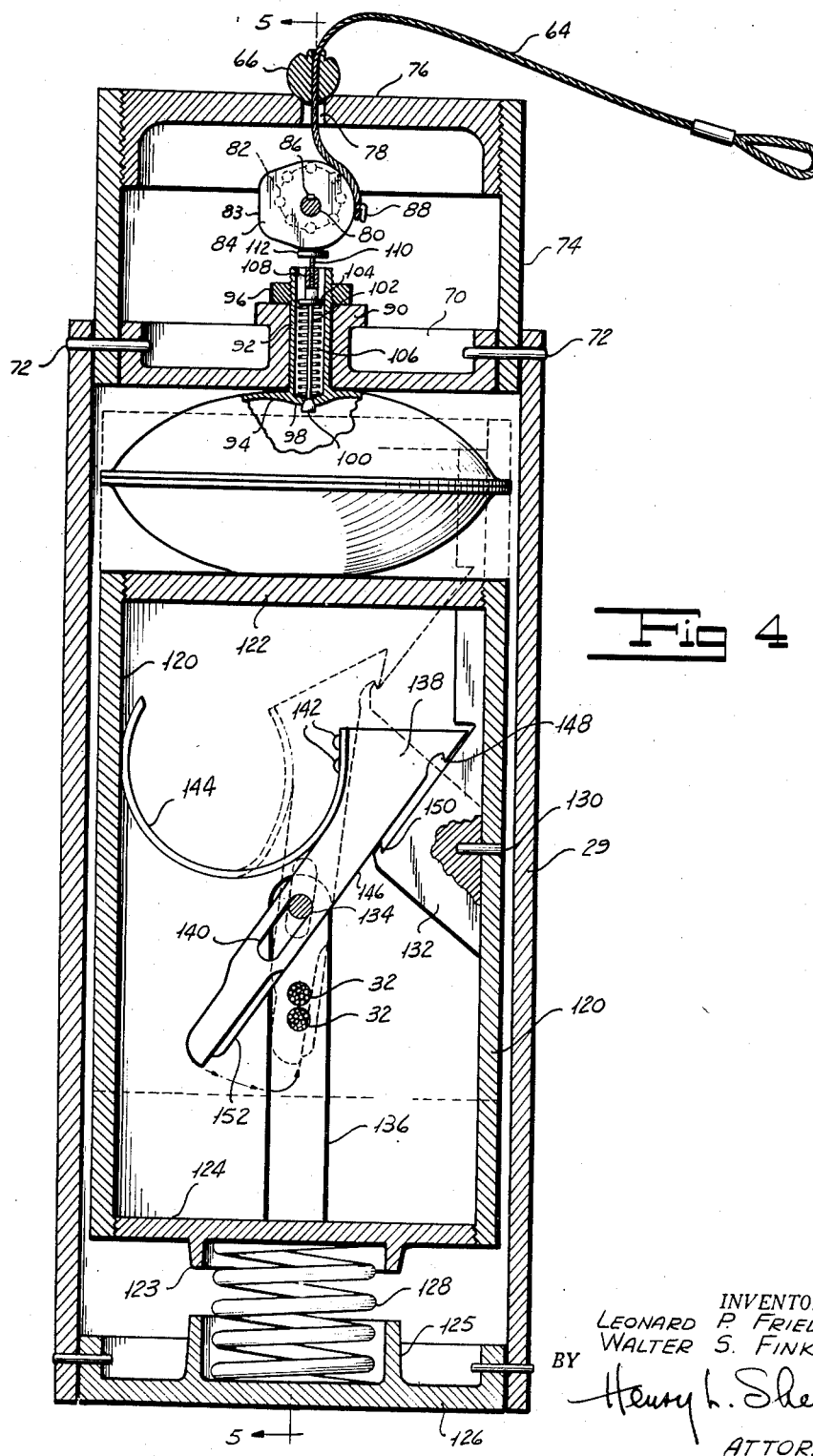

Aug. 12, 1952 — L. P. FRIEDER ET AL — 2,606,729
DELAY OPENING PARACHUTE PACK AND PNEUMATIC
RELEASING ASSEMBLY THEREFOR
Filed May 25, 1949 — 4 Sheets-Sheet 3
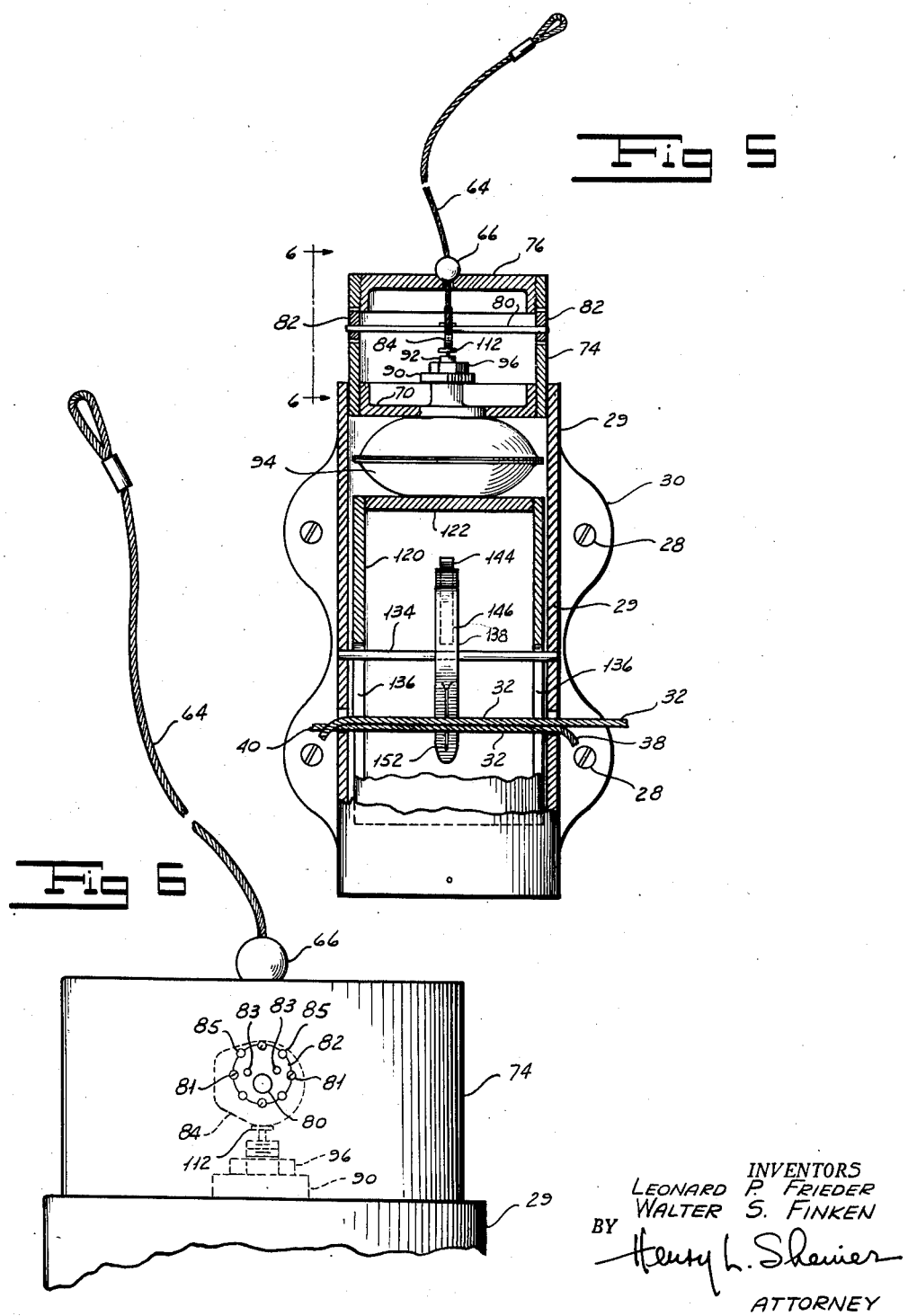
INVENTORS
LEONARD P. FRIEDER
WALTER S. FINKEN
BY Henry L. Shenier
ATTORNEY

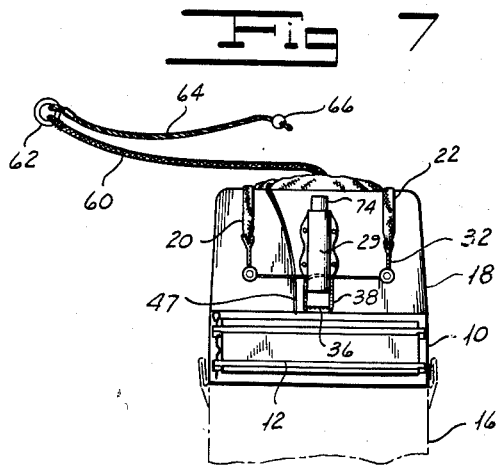
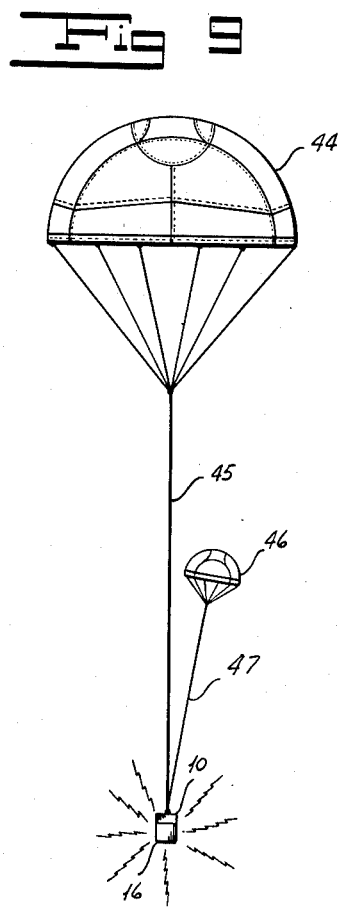
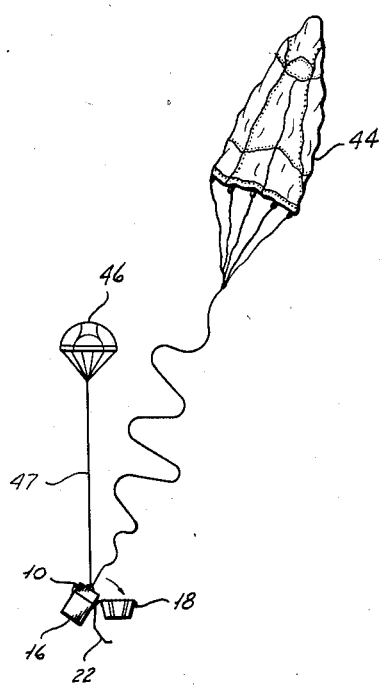

Patented Aug. 12, 1952

2,606,729

UNITED STATES PATENT OFFICE 2,606,729

DELAY OPENING PARACHUTE PACK AND PNEUMATIC RELEASING ASSEMBLY THEREFOR

Leonard P. Frieder, Great Neck, and Walter S. Finken, Brooklyn, N. Y., assignors, by mesne assignments, to Reconstruction Finance Corporation, Philadelphia, Pa., a corporation of the United States Application May 25, 1949, Serial No. 95,222

7 Claims. (Cl. 244—150)

Our invention relates to a delay opening parachute pack and pneumatic releasing assembly therefor.

This application is an improvement of our co-pending application Serial No. 786,861, filed November 13, 1947, now Patent 2,582,113 of January 8, 1952.

It is frequently desirable to drop equipment, apparatus or the like from rapidly moving airplanes by means of parachutes. It is well known that in order to preclude the fouling of the parachute upon the airplane or parts thereof it cannot be opened until it is clear of the airplane and its slip stream. This is usually accomplished by means of a static line which permits the parachute pack to fall a predetermined distance from the airplane before the pack is opened.

With high-speed planes, however, the velocity of the plane is such that initially the parachute pack is traveling at substantially the same speed as the plane, which speed is so high as to introduce opening shocks which may cause parachute failures due to the imposition of abnormal stresses.

These stresses may be successfully overcome by the use of a parachute having a hemispherical canopy and a floating hem cord such as described in United States patent to Walter S. Finken 2,412,892, dated December 10, 1946.

Where, however, delicate instruments are being dropped, it is imperative that the velocity of the pack be reduced before the parachute is opened in order to reduce to a minimum opening shocks which might serve to derange the relatively delicate instruments to be borne by the parachute. For example, there has been developed a radio signaling assembly adapted to transmit radio signals in response to the barometric pressure, the temperature, wind velocity, and the humidity of the atmosphere. These instruments are employed to obtain weather reports over otherwise inaccessible territory which is not adequately covered by ground stations as, for example, over oceans and in the polar regions. The importance of correct weather data for trans-oceanic flights cannot be overemphasized. One small airline, for example, making six flights a week between New York and a European port has estimated that by reducing the flight time twenty-five minutes a saving of about $12,000 a month would result principally from fuel economy. The decrease in fuel consumption serves to increase the payload which may be carried in lieu of fuel.

The present system of obtaining weather data employs reports based on personal observations of pilots which information is either incorrect in whole or in part with the result that meteorologists attempt to predict the weather over the route upon data which is frequently conjectural. Airplanes accordingly fly a northern course until bad weather is encountered and are then directed to a southern course. The meteorologists have no means of knowing how long the bad weather existing on the northern course will continue and hence redirect ships to fly the northern course based largely on conjecture.

By the use of the radio weather equipment, transatlantic airplanes may fly the extreme northern course. The pilots may drop radio weather data equipment periodically which will enable meteorologists to predict the weather with a high degree of accuracy, eliminating all conjecture. This method is of high importance not only in civilian aviation but in military uses. It is understood, of course, that absolute reliability is of paramount importance. In order to obtain this reliability, it is necessary that this equipment function at each drop. We have found that we are able to drop sensitive radio weather data gathering equipment by means of the delay opening parachute pack which is the subject of this invention.

In Patent No. 2,582,113 we have shown a delay opening parachute pack and releasing assembly therefor in which a powder train adapted to burn a predetermined period of time was the means for introducing the delay. We have found that this system works admirably for most altitudes and conditions. When an extremely high altitude is reached, however, the low pressures existing are such that the powder train will function erratically.

One object of our invention is to provide a parachute pack which will open only at a predetermined time after being dropped from an airplane within the limits of the time delay mechanism.

Another object of our invention is to provide a novel time delay mechanism which is inexpensive to manufacture and certain in its operation.

Another object of our invention is to provide a time delay parachute pack having a release assembly with few moving parts.

A further object of our invention is to provide a time delay parachute pack employing pneumatic means in which the controlled escape of a gas under pressure determines the time of opening of the pack.

Still a further object of our invention is to provide a pneumatic time delay assembly in which the delay time may be controlled in a simple, convenient and expeditious manner.

Other and further objects of our invention will appear from the following description.

For purposes of illustration and not by way of limitation, we will describe our invention as applied to a radio weather gathering instrument adapted to transmit signals relating to information of use to meteorologists, such as the barometric pressure, the temperature of the atmosphere, the velocity of the wind, the humidity of the air and the like. It is to be understood, however, that our time delay parachute pack may be employed for any purpose where it is desired to delay the opening of the parachute for a predetermined interval of time after it is dropped from an airplane.

In the accompanying drawings which form part of the instant specification and which are to be read in conjunction therewith and in which like reference numerals are used to indicate like parts in the various views:

Figure 4 is a sectional view drawn on an enlarged scale taken along the line 4—4 of Figure 1 and showing the pneumatic delay assembly.

Figure 5 is a sectional view drawn on a smaller scale taken along the line 5—5 of Figure 4.

Figure 6 is a fragmentary side elevation drawn on a larger scale viewed along the line 6—6 of Figure 5.

Figure 7 is a view similar to Figure 1 showing the position of parts immediately after the delay action has been initiated.

Figure 8 is a perspective view showing the position of parts immediately after the time delay assembly has acted to release the main parachute showing it in the process of being streamed.

Figure 9 is a view showing the position of parts with the signaling apparatus in operation borne by the main parachute after it has opened.

Figure 1:
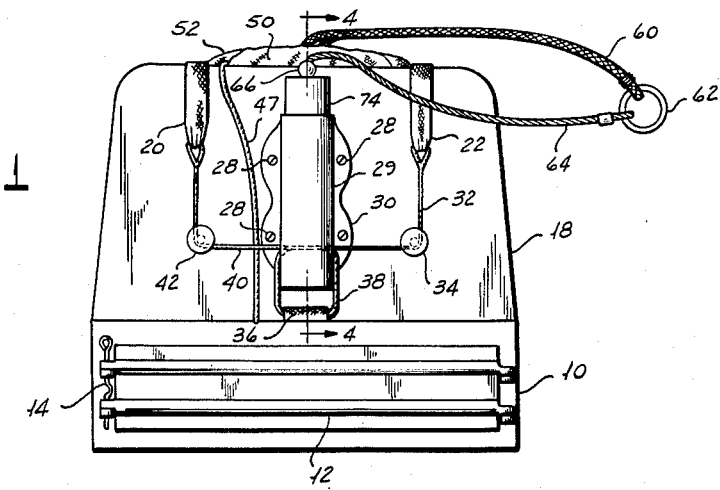
Figure 1 is a front elevation of a delay opening parachute pack in combination with a pneumatic releasing assembly therefor.

In general our invention contemplates the provision of a parachute pack releasably held in assembled position by a frangible member which is adapted to be severed by a knife, which is mounted for drawing and pivotal motion adapted to bring it into contact with the securing cord which is to be severed. A collapsible bag containing gas under pressure operates an assembly holding the knife out of engagement with the cord against the action of a spring. The time delay is introduced by permitting the gas to escape from the collapsible bag, thus permitting the spring to actuate a cam adapted to rotate the knife blade into contact with the cord and then draw the knife across the cord to sever it. Means are provided for controlling the rate of escape from the collapsible bag, thus introducing variations in the delay time. A static line is attached to the airplane from which our assembly is to be dropped. The static line contains two forks, one of which initiates the delay action, and the other of which releases a pilot parachute.

More particularly, referring now to the drawings, a base member 10 is formed with a door 12 closed by a pin 14 and is adapted to house batteries for the radio equipment which forms no part of the instant invention and which is housed in a container 16 shown in dotted lines in Figure 7 and carried by the base member 10. A box-shaped member 18 is held to the base by means of a pair of securing members 20 and 22 which are pinned to the base by means of pins 24 and 26. The box-like cover member 18 carries a housing 30 secured thereto by means of rivets 28. The front of securing member 20 and the front of securing member 22 are held downwardly in tensioned condition by means of a cord or frangible member 32, as can readily be seen by reference to Figure 1. The member 32 passes around a fair lead 34, thence through the delay releasing mechanism and downwardly through a loop 36 of webbing. This loop is secured to the base 10. The member 32 then continues upwardly at 38 and thence through the delay releasing assembly adjacent the first lead 32 and outwardly at 40 around fair lead 42 to securing member 20. It will be seen that the cover member 18 is held to the base by securing members 20 and 22. The rear ends of the securing members are secured to the base by the pins 24 and 26. The front ends of the securing members are secured to the base by the cord 32, the lower end of which is passed through the webbing loop 36 which is secured to the base. Two lengths of the cord 32 pass through the casing 29 formed integrally with the member 30. A main supporting parachute canopy 44 is housed within the top 18 between it and the base 10. A pilot parachute 46, which has a load line 47 connected to the base 10, is assembled on the upper portion of the top 18 within a covering member having four flaps 48, 50, 52 and 54. Flaps 48 and 50 are held together by a frangible cord 56. Flaps 52 and 54 are held together by a frangible cord 58. The static line 60 has a pair of ends 61 and 63 secured to the cords 56 and 58 respectively. The ring 62 is adapted to be secured to the static line attached to the airplane. A lanyard 64 is also secured to the ring 62 and this lanyard initiates the action of the delay release mechanism, as will be pointed out more fully hereafter. The tug upon the line 60 breaks the frangible members 56 and 58 and releases the pilot parachute. The securing member 20 may, instead of being a single member, be formed with two sections tied together by a cord 21, as can readily be seen by reference to Figure 2. Similarly, the securing member 22 may be formed with two sections tied together by a cord 23.

Referring now to Figure 4, the casing 29 is closed at its upper end by a cover 70 secured to the casing by means of pins 72. The pins 72 also position a cylindrical member 74 extending upwardly from the casing 29. The member 74 is closed by a cover 76 provided with an opening 78 through which the lanyard 64 extends. The lanyard 64 has placed around it a spherical sealing ball 66 adapted to close the opening 78, as can readily be seen by reference to Figure 4. A shaft 80 is carried by the side walls of the cylindrical member 74 by means of a pair of eccentric bushings 82, as can readily be seen by reference to Figures 5 and 6. A cam 84 is keyed to the shaft 80 by means of a key 86. The cam carries a hook 88 over which the end of the lanyard 64 is adapted to pass. The cover 70 is formed with a central nipple 90 through which a pipe 92 passes. The pipe 92 terminates in a member 94 which is made of rubber or any collapsible material impervious to gas. While we have shown the member 94 as a rubber bladder, it is understood that it may be made in the form of a bellows or the like. The pipe 92 may be vulcanized and is normally held within the nipple by a nut 96 threadedly secured to the exterior of the pipe 92. The lower end of pipe 92 is formed with a valve seat 98 normally closed by a valve 100. The valve 100 is secured to a valve stem 102 carrying a collar 104. A spring 106 normally urges the valve 100 to closed position. An internally threaded member 108 is carried by the collar 104. A threaded member 110 which carries a follower plate 112 is threadedly positioned within the member 108. The cam 84 engages the follower plate 112.

The construction is such that when the lanyard 64 is pulled, the cam will rotate in a counterclockwise direction pushing the valve stem 102 down against the action of the spring 106, thus opening the valve 100 and permitting the compressed gas within the bladder 94 to escape. The cam 84 is formed with a flattened portion 83 adapted to hold the valve in open position once the cam is rotated to bring the flattened surface 83 into contact with the follower plate 112. Within the casing 29 we position a knife operating cam carrier 120 which comprises a cylindrical body formed with a cover 122 and a bottom plate 124. Between the bottom plate 124 and the plate 126 of the casing 29 we position a spring 128 urging the knife operating cam carrier 120 upwardly. This upward motion is normally resisted by the bladder 94 which is in inflated condition. Secured to the side of the member 120 by means of a pin 130 we mount a knife operating cam 132. A shaft 134 is carried by the sides of the casing, as can readily be seen by reference to Figures 4 and 5. The member 120 is provided with a pair of slots 136 permitting the passage of the shaft 134 and of the cords 32. A knife holder 138 is provided with a slot 140 through which the shaft 134 passes. Secured to the holder 138 by means of a pair of rivets 142 we provide a spring 144 the end of which is adapted to contact the interior walls of the knife operating cam carrier 120. This is adapted normally to rotate the knife in a clockwise direction and to maintain it in the full line position shown in Figure 4. The inclined surface 146 of the knife holder 138 is formed adjacent its upper end with a hook 148. The knife operating cam 132 is formed adjacent its lower surface with a hook 150. The lower end of the knife holder 138 is sharpened to form a knife blade 152 which is positioned adjacent the cords 32. The lower surface of the plate 124 is provided with a nesting flange 123 adapted to position the upper end of the spring 128. The upper surface of the plate 126 is provided with a nesting flange 125 adapted to position the lower end of spring 128.

Figure 2:
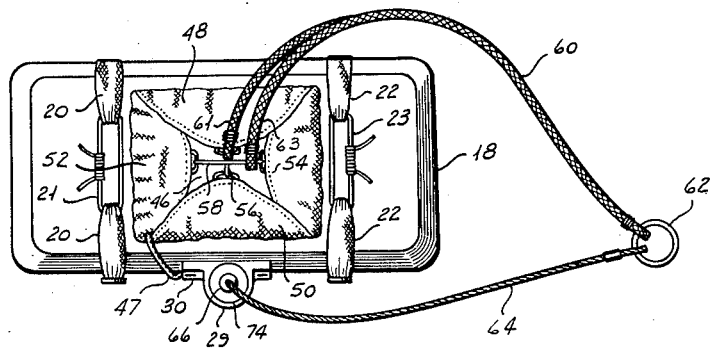
Figure 2 is a top plan view of the parachute pack shown in Figure 1.

In operation the pack is assembled as shown in Figure 1 with a radiosonde in casing 16 secured to the base 10 as shown in Figure 7. When it is desired to take a sounding a crew member of the carrying airplane deposits the assembly in an air lock provided for this purpose. A static line secured to the airplane is attached to ring 62. When the assembly is launched the static line will first pull the lanyard 64 which is somewhat shorter than the bifurcated member 60. When this occurs the sealing member 66 is lifted from its seat and the cam 84 is rotated in a counterclockwise direction moving the follower 112 downwardly and opening the valve 100. The parts in a position shown in Figure 4 in full lines when the launching occurs. The opening of the valve 100 permits a liquid or gas under pressure, which may be oil, water or air, nitrogen, carbon dioxide and the like, to escape from the bladder 94, thus initiating the time delay. The position of the assembly at this instant is shown in Figure 7. The next action which occurs is a sudden force applied to the frangible cords 56 and 58 thus freeing the flaps 48, 50, 52 and 54 and permitting the pilot parachute to stream. The pilot parachute retards the velocity of the descent of the assembly sufficiently so that when the main canopy is opened the shock will be insufficient to derange the comparatively sensitive instruments in the radiosonde. Then too, the pilot parachute prevents the instrument assuming a reverse position, thus preventing it from being sharply rotated upon the opening of the main parachute. The period of time delay is governed by the amount of valve opening 100. This can be adjusted in two ways. First by threadedly moving the rod 110 into and out of the internally threaded member 108. The second manner of adjustment of throw which may be performed without disassembling the instrument can be seen by reference to Figure 6. The shaft 80 which carries the cam 84 is mounted in an eccentric 82 which is normally held against rotation by a pair of screws 81. By removing these screws the eccentric 82 may be rotated by means of openings 83 adapted to receive a spanner wrench. The rotation of the eccentric will move the shaft 80 upwardly and downwardly, thus varying the effective throw of the eccentric. The screws may then be positioned in any of the threaded openings 85 provided for this purpose. In this manner variations in time delay may be made just before the instrument is launched.

Figure 3:
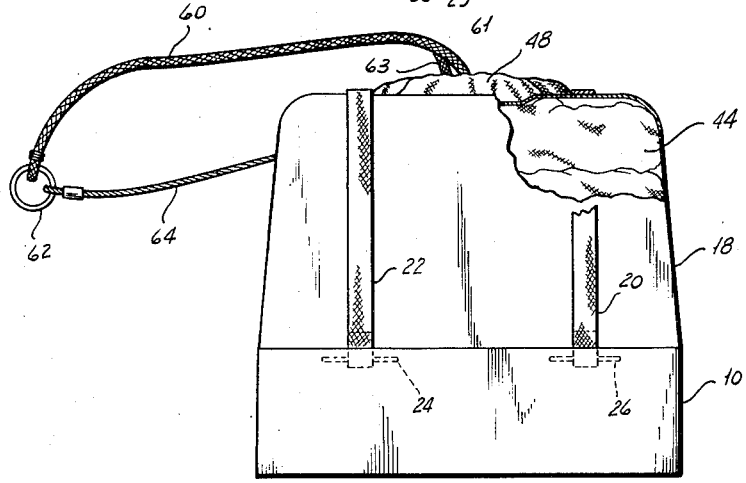
Figure 3 is a rear elevation of the parachute pack shown in Figure 1.

As the compressed gas bleeds from the bladder 94 the spring 128 pushes the knife operating cam housing 120 upwardly. The initial part of this movement comprises the pivoting of the knife holder in a counterclockwise direction against the action of the spring 144, tending to move the knife to the dotted line position shown in Figure 4 and into contact with the cords 32. These cords are normally under tension which is achieved by the pull of the members 20 and 22, and frequently the pivotal motion or scissors action of the knife against the cord will be sufficient to sever the cord. To ensure the severing, however, we provided for a drawing motion in addition to the scissors action. The hook 150 upon the knife operating cam 132 will engage the hook 148 upon the knife holder and continued deflation of the bladder will permit the spring 128 to draw the knife upwardly while held into contact with cords 32 by means of the cam. This ensures a severing of the cords 32. It is to be noted that only one of the cords 32 need be severed to free the loop 38 which is threaded through the webbing loop 36. As soon as this occurs the front of the cover 18 will pivot upwardly away from the base under the influence of the tension of the pilot parachute load line 47, permitting the main parachute canopy 44 to stream. The position of the parts at this instant is shown in Figure 3. As soon as the main canopy 44 is streamed the tug upon its suspension line 45 initiates the action of the radio equipment in the housing 16 and sends out signals as is known to the art. These signals will depend upon the particular radiosonde and usually relate to wind velocity, temperature, humidity and barometric pressure. The carrying plane may transmit the geographic position of the drop by latitude and longitude as well as the altitude from which the drop took place.

It will be seen that we have accomplished the objects of our invention. We have provided a parachute pack which will open only at a predetermined time after being dropped from an airplane within the limitations of the time delay mechanism. We have provided an improved time delay mechanism which is inexpensive to manufacture and certain in its operation. We have provided a time delay parachute pack for a release assembly with relatively few moving parts. We have provided a time delay mechanism employing pneumatic means in which the time delay is introduced by the controlled escape of gas under pressure and in which we may control the delay time in a simple, convenient and expeditious manner by varying the rate at which the compressed gas escapes.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention what we claim is:

1. A delay releasing assembly including in combination a hollow member having a movable wall and adapted to contain a fluid under pressure, said fluid being a gas under superatmospheric pressure, said member being formed with a fluid escape port, a valve normally closing said port, a movable member, means normally biasing said movable member to move in a predetermined direction, said hollow member normally being positioned to oppose the movement of said member against the action of said biasing means, and means for opening said valve whereby the escape of fluid from said hollow member will permit its movable wall to move under the influence of said biasing means to initiate the desired releasing action.

2. A delay releasing assembly including in combination an expandable member adapted to contain a compressed gas, said member being formed with a gas escape port, a valve normally closing said port, a movable member, a knife carried by said movable member, means normally biasing said movable member to move in a predetermined direction, said expandable member being positioned to oppose the movement of said member against the action of said biasing means, means for opening said valve whereby the escaping gas from the expandable member will permit it to collapse under the influence of said biasing means, means responsive to the movement of said movable member for rotating said knife, and securing means positioned in the path of said knife, the construction being such that when said knife severs said securing means, the desired release action will be initiated.

3. A delay releasing assembly as in claim 2 in which said movable member comprises a housing, means for mounting said knife for translation and means responsive to the movement of said housing for translating said knife in addition to rotating it.

4. A delay releasing assembly as in claim 2 in which said means for opening said valve comprises a cam.

5. A delay releasing assembly as in claim 2 in which said means for opening said valve comprises a cam and means for adjusting the effective throw of said cam.

6. In a delay releasing assembly, a housing, a member mounted for reciprocating movement within the housing, means normally biasing the reciprocating member to move in a predetermined direction, a severable securing member, means for mounting said severable securing member to extend through the housing, a knife, means for mounting the knife on the housing for rotation with respect thereto and for bodily movement relative to the axis of rotation and in proximity to the severable member, means for moving the knife relative to its axis of rotation in response to movement of the reciprocating member and for simultaneously rotating the knife, and time delay means for permitting the reciprocating member to move under the influence of the biasing means whereby to actuate the knife to sever the severable means to initiate the desired releasing action.

7. A delay releasing assembly as in claim 6 in which said means for moving the knife comprises coacting cam and stop means carried by the reciprocating member and the knife, the construction being such that movement of the reciprocating member will first rotate the knife to a position against the stop and continue movement of the reciprocating member after the stop means are in engagement, and move the knife relative to its axis of rotation.

LEONARD P. FRIEDER.
WALTER S. FINKEN.

REFERENCES CITED

The following references are of record in the file of this patent:

UNITED STATES PATENTS

| Number | Name | Date |
|---|---|---|
| 729,014 | Thornton | May 26, 1903 |
| 1,004,761 | Filiasi | Oct. 3, 1911 |

FOREIGN PATENTS

| Number | Country | Date |
|---|---|---|
| 278,695 | Great Britain | Apr. 5, 1928 |
| 814,497 | France | Mar. 22, 1937 |